C. JOSEPH.
BOLT ANCHOR.
APPLICATION FILED MAR. 29, 1912.
1,066,500.
Patented July 8, 1913.
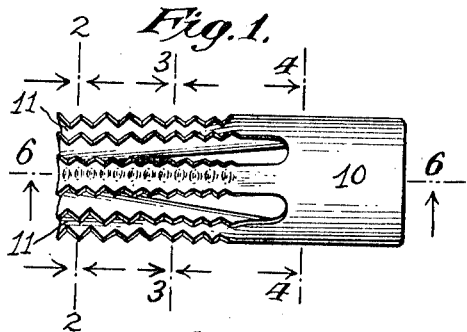
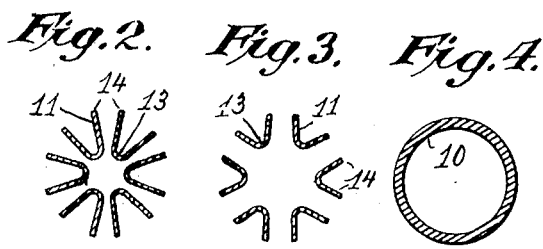
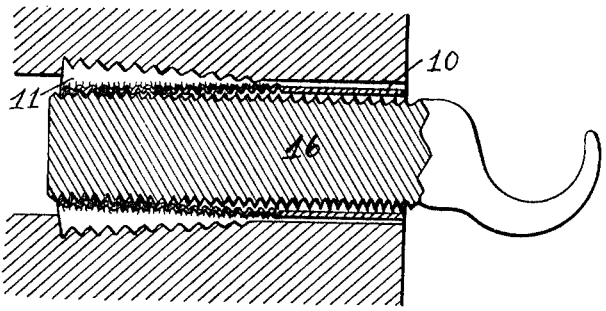
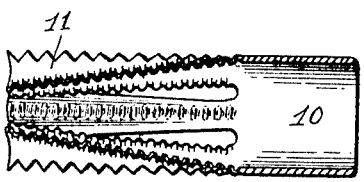
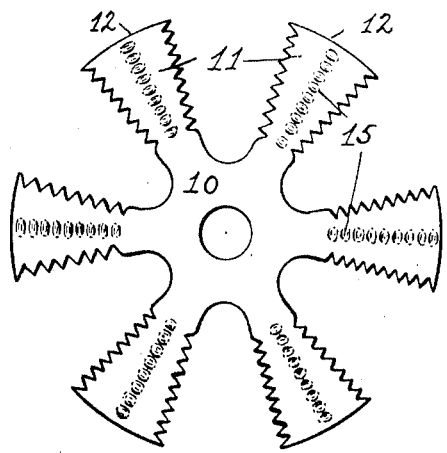
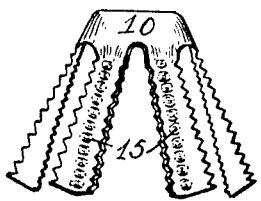
Attest:
Edna A. Moreland
Alan G. McDonnell
Carl Joseph, Inventor:
by William R. Baird,
his Att'y

UNITED STATES PATENT OFFICE.

CARL JOSEPH, OF BAYONNE, NEW JERSEY.

BOLT-ANCHOR.

1,066,500.　　　　　Specification of Letters Patent.　　Patented July 8, 1913.

Application filed March 29, 1912.　Serial No. 687,158.

*To all whom it may concern:*

Be it known that I, CARL JOSEPH, a subject of the German Emperor, residing at Bayonne, in the county of Hudson and State of New Jersey, have invented certain new and useful Improvements in Bolt-Anchors, of which the following is a specification.

This invention relates to bolt anchors and its novelty consists in the construction and adaptation of the parts, as will be more fully pointed out hereinafter.

In the drawings, Figure 1 is a side view of a bolt anchor embodying the invention; Fig. 2 is a transverse section of the same on the plane of the line 2—2 in Fig. 1; Fig. 3 is a similar section on the plane of the line 3—3 in Fig. 1; Fig. 4 is a similar section on the plane of the line 4—4 in Fig. 1; Fig. 5 is a longitudinal section showing a screw hook inserted and the bolt anchor expanded; Fig. 6 is a longitudinal section of the bolt anchor before expansion; Fig. 7 is a plan of the blank out of which the anchor is formed; and Fig. 8 is a view of the blank partly formed into the anchor.

In the drawings, 10 is the body portion of a bolt anchor formed by any suitable means into a substantially cylindrical shape. Extending longitudinally and inwardly from such body, and preferably formed integral therewith, are a series of segments 11 flaring and tapering inwardly so that they are wider at their outer ends 12 than at their inner ends where they join the tubular body portion 10. Each segment 11 is folded along its center line 13 so that its edges 14 are maintained at substantially the same distance apart radially from the imaginary axis of the cylindrical body of the finished device. Thus, the creased or folded portion is deepest at its free end and shallowest at the place where it joins the tubular body 10. In effect, when formed, the outer portion of the device presents externally the appearance of a tubular body with tapering longitudinal depressions for a portion of its length, while internally the body is substantially conical.

The edges 14 of each segment 11 are preferably serrated or notched, and the bent or folded portion is scored or provided with indentations 15 preferably arranged in spiral relation so that they will aptly engage the threads of the bolt or screw 16 to be inserted in the device.

The device is preferably formed out of the blank illustrated in Figs. 7 and 8. This blank is preferably stamped out of a single piece of suitable metal. It is then bent over into the form shown in Fig. 1, each segment being simultaneously creased and scored, an intermediate position being shown in Fig. 8.

In use, the bolt anchor is first inserted as a tubular body in a cylindrical aperture formed to receive it in the wall into which it is to be inserted (see Fig. 5). A screw or bolt 16 is then inserted and rotated and, as it is rotated, the anchor gradually expands and tightly holds the screw in position.

What I claim as new is:

1. A bolt anchor, comprising a sheet metal tubular open-ended body and a segment projecting longitudinally beyond one end of the same, being of sheet metal and integrally connected to the body, said segment having its outer portion substantially in line with the body and having a portion inset into line with the bore of the body.

2. A bolt anchor, comprising a sheet metal tubular open-ended body and at least three independent radially separable segments of sheet metal projecting longitudinally from one end of the body, said segments having their outer portions substantially in line with the body and having longitudinally disposed inset portions that are disposed in line with the bore of the body.

3. A bolt anchor, comprising a tubular open-ended body and a plurality of segments projecting from one end of the same, said segments having longitudinally disposed anchoring edges normally located in substantial alinement with the body walls and having their longitudinal intermediate portions inset to form a tapered throat in line with the bore of the body.

4. A bolt anchor, comprising a tubular open-ended body and a plurality of segments projecting from one end of the same, said segments tapering toward the body and having longitudinally disposed anchoring edges normally arranged in substantial alinement with the body, said segments furthermore having their longitudinal intermediate portions inwardly creased to form a contracted portion in line with the bore of the body.

5. A bolt anchor, comprising a tubular open ended body and a plurality of segments projecting from one end of the same, said segments being longitudinally and inwardly creased, said creases being deeper at the free ends of the segments than at the ends adjacent to the body, and said segments having their edges disposed substantially parallel to the body walls and in line therewith.

6. A bolt anchor, comprising a body formed of an open-ended seamless sheet metal tube and a plurality of independent radially separable anchoring segments projecting from one end of the same and integral therewith.

7. As an article of manufacture, a bolt anchor formed of sheet metal having a continuously walled tubular body portion and integral longitudinal projecting segments at one end that are inwardly concaved and tapered in width toward the body portion, the edges of said segments being outset and serrated and the inner faces being transversely corrugated to form screw thread sections.

In testimony whereof I affix my signature in presence of two witnesses.

CARL JOSEPH.

Witnesses:
ALAN C. McDONNELL,
EDNA A. MORELAND.